US006326089B1

(12) United States Patent
Claxton

(10) Patent No.: US 6,326,089 B1
(45) Date of Patent: Dec. 4, 2001

(54) MULTI-ELEMENT COMPOSITE OBJECT

(76) Inventor: Raymond J. Claxton, 10338 Miller Rd., Dallas, TX (US) 75238

( * ) Notice: Subject to any disclaimer, the term of this patent is extended or adjusted under 35 U.S.C. 154(b) by 0 days.

(21) Appl. No.: 09/050,227

(22) Filed: Mar. 28, 1998

(51) Int. Cl.[7] .............................. B32B 15/01; B23K 1/19; B23K 20/12
(52) U.S. Cl. .......................... 428/615; 428/660; 428/673; 428/677; 428/683; 428/685; 228/113; 74/423; 74/424
(58) Field of Search ..................................... 428/615, 660, 428/683, 688, 673, 677; 74/423, 424; 228/113

(56) References Cited

U.S. PATENT DOCUMENTS 5,492,264 * 2/1996 Wadleigh .
5,881,607 * 3/1999 Ito et al. .

* cited by examiner

*Primary Examiner*—Deborah Jones
*Assistant Examiner*—Jason Savage
(74) *Attorney, Agent, or Firm*—Burkhart & Burkhart; Anne K. Burkhart; Patrick N. Burkhart

(57) ABSTRACT

A multi-element composite object composed from first, second, and third metal components is provided, wherein the first metal and the third metal are weld incompatible. The multi-element composite object includes a first component fabricated from a first metal. A second component, fabricated from a second metal, is brazed to the first component. A third component, fabricated from a third metal, is inertia welded to the second component . The first metal may be provided as a titanium alloy, e.g. a TiNi alloy. The second metal may be provided as low-carbon mild or alloy steel. The third metal may be provided as alloy steel, e.g., 9310 nickel alloy steel. In an embodiment, the multi-element composite object is a gear assembly, with the first element of the gear assembly object being a shaft and the third element of the gear assembly being a gear member with hardened teeth surfaces. The first and second components can be mechanically keyed together via an anti-rotational element. The anti-rotational element can be provided as a pin-in-groove arrangement or a twist-fit arrangement A method of making a multi-metal composite object including a first component fabricated from a first metal, a second component fabricated from a second metal, and a third component fabricated from a third metal, wherein the first metal and the third metal are weld incompatible, is also disclosed. The first step of the method includes mechanically keying the first component to the second component. Net, the first component is brazed to the second component. Finally, the third component is welded to the second component. Where the first metal is a Ti alloy and the second metal is low-carbon steel, the step of brazing the first component to the second component can include brazing using a brazing material such as Ag and Cu. Where the third component is heat-treated steel, the assembly can be stress-relieved after inertia welding at a temperature sufficiently low so as not to degrade the heat-treated properties of the third component.

16 Claims, 2 Drawing Sheets

MULTI-ELEMENT COMPOSITE OBJECT

STATEMENT AS TO RIGHTS TO INVENTIONS MADE UNDER FEDERALLY-SPONSORED RESEARCH AND DEVELOPMENT

None.

CROSS-REFERENCE TO RELATED APPLICATIONS

None.

FIELD OF THE INVENTION

The invention relates generally to multi-element composite objects. In particular, the invention relates to multi-element composite objects fabricated from weld-incompatible metals.

DESCRIPTION OF RELATED ART

Objects employing combinations of different metals, so-called "composite objects" are hardly new. For example, archaeologists have discovered artifacts combining iron and bronze components that date from before the birth of Christ. One basic premise present in these primitive metallurgical developments has carried through the centuries: the desirable characteristics of different metals may be combined by their use in a single object.

One modern application of this premise is in the aircraft industry. It is well-recognized that every gram of weight that can be removed from an aircraft will pay large dividends by way of reduced fuel consumption, increased performance, or increased payload. Thus, a constant theme in the manufacture of aircraft components is the need to reduce the weight of every component while maintaining or increasing component strength and structural integrity.

One area in which this theme is illustrated abundantly is in the fabrication of gears for use in aircraft. It is typical of such structures that the gear teeth, splines, and bearing races call for materials that have hard surfaces to resist wear, contact fatigue, and bending fatigue. By contrast, gear web and shaft portions are free of such requirements, and are therefore prime candidates for achieving weight reduction.

In order to meet these goals, steel alloy gears with titanium alloy webs and shafts have been proposed. Unfortunately, traditional welding and casting methods are practically ineffective for joining these alloys together. One solution to this problem is described in U.S. Pat. No. 5,492,264 to Wadleigh et al., which is incorporated by reference herein. The '264 disclosure is directed to a composite object formed by using inertia welding to join first and second dissimilar elements together via a third, mutually-compatible interlayer metal element. The method for forming the composite object involves inertia welding the interlayer to the first element, then inertia welding the second element to the interlayer. In an illustrative embodiment, the composite object is a multi-metal element composite gear, web, and shaft. In a preferred embodiment, a hardened steel alloy gear is inertia welded to an aluminum interlayer, which is in turn inertia welded to a titanium alloy shaft.

While this solution overcomes many of the longstanding problems described herein, it is not without possible shortcomings itself. One area for improvement is in the nature of the interlayer. Despite the fact that aluminum is used extensively in the aircraft industry, there is an impression of vulnerability associated with some aluminum components. This impression is that, while aluminum is a very desirable material for airframes, it is unsuitable for powerplant and transmission applications. Aluminum components introduce a temperature limitation of approximately 350° F., above which the metal begins to thermally soften. Although gearboxes do not ordinarily operate at temperatures above 350° F., there is a military requirement for gearboxes to function for one hour after all the oil is drained out. The reason for this damage tolerance is to allow the crew sufficient time for escape and egress after the gearbox has been punctured, typically by gunfire or other ordnance. In the civilian world, it is extremely rare for aircraft to be subjected to gunfire, even when such aircraft are operating over high-crime urban areas. However, particularly in the case of helicopters, the same manufacturers make aircraft for civilian and military use. Consequently, the design approach (and many standard components such as gearboxes) are common to both applications.

It can be seen from the foregoing that the need exists for multi-metal composite objects, and methods for their manufacture, that meet weight and strength objectives without sacrificing emergency operating capabilities.

SUMMARY

The present invention achieves these and other objects by providing a multi-element composite object composed from first, second, and third metal components, wherein the first metal and the third metal are weld incompatible. The multi-element composite object includes a first component fabricated from a first metal. A second component, fabricated from a second metal, is brazed to the first component. A third component, fabricated from a third metal, is inertia welded to the second component. The first metal may be provided as a titanium alloy, e.g. a TiNi alloy. The second metal may be provided as steel, e.g., low-carbon alloy or mild steel. The third metal may be provided as alloy steel, e.g., 9310 nickel alloy steel.

In an embodiment, the multi-element composite object is a gear assembly, with the first element of the gear assembly object being a shaft and the second element of the gear assembly being a gear member with hardened teeth surfaces. The first and second components can be mechanically keyed together via an anti-rotational element. The anti-rotational element can be provided as a pin-in-groove arrangement or a twist-fit arrangement.

A method of making a multi-metal composite object including a first component fabricated from a first metal, a second component fabricated from a second metal, and a third component fabricated from a third metal, wherein the first metal and the third metal are weld incompatible, is also disclosed. The first step of the method includes mechanically keying the first component to the second component. Next, the first component is brazed to the second component. Finally, the third component is welded to the second component. Where the first metal is a Ti alloy and the second metal is low-carbon mild or alloy steel, the step of brazing the first component to the second component can include brazing the steel component to the Ti alloy component using a brazing material selected from a group consisting of Ag and Cu. Where the third component is heat-treated steel, the inertia weld joint between the second and third components may be stress-relieved at a temperature sufficiently low so as not to degrade the heat-treated properties of the third component after inertia welding the third component to the second component.

The features of the invention believed to be patentable are set forth with particularity in the appended claims. The

DETAILED DESCRIPTION OF A PREFERRED EMBODIMENT

Figure 1:
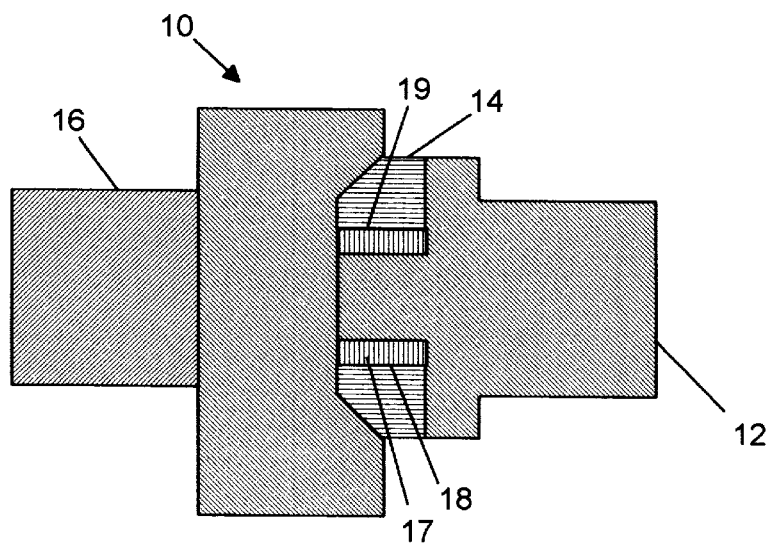
FIG. 1 is a schematic sectional view of a multi-metal composite object.

While the invention is susceptible of embodiment in many different forms, there are shown in the drawings, and will herein be described in detail, exemplary embodiments, with the understanding that the present disclosure is to be considered as illustrative of the principles of the invention and not intended to limit the invention to the exemplary embodiments shown and described.

A multi-metal composite object 10 is shown in FIG. 1. The multi-metal composite object 10 is illustrated as what is commonly known as a torsion test coupon. The multi-metal metal composite object 10 includes a first component 12, a second component 14, and a third component 16. The first component 12 is fabricated from a first metal selected to provide a desired characteristic, for example, the component 12 may be fabricated from a titanium alloy, such as Ti-6Al-4V, to provide reduced weight. The third component 16 is fabricated from a second metal selected to provide a different desired characteristic, for example, the component 16 may be fabricated from a steel alloy, such as carburized alloy 9310, to provide strength and surface hardness.

It is frequently the case that metals having widely differing characteristics have molecular compositions that render them difficult to join together, i.e., weld incompatible. This is true with titanium alloys and steel alloys generally, and with Ti alloy Ti-6Al-4V and carburized steel alloy 9310 specifically. Accordingly, the second component 14 is provided as a connecting member between the first component 12 and the third component 16. The second component 14 is fabricated from a material that can be joined to the weld-incompatible materials of the first component 12 and the third component 16. In the present example, the second component 14 can be fabricated from a low-carbon mild steel or low-carbon alloy steel, such as 1018 or 9310 steel. It Is believed that alloy steel or mild steel having a carbon content below around 0.25 would be suitable.

As shown in FIG. 1, the first component 12 is joined to the second component 14 by brazing, for example, by vacuum/inert gas brazing with silver alloy or copper alloy brazing material. In order to provide additional rotational strength, one or more keys, here shown as cross-sectionally square steel keys 18, may be provided. The keys 18 fit into corresponding grooves 20, 22 in the first component 12 and the second component 14. The first component 12, second component 14, and keys 18 are assembled, and then brazed completely along all interfaces. It the first and second components were not mechanically keyed together, the torsional operating stresses would be borne by the braze material alone. The provision of mechanical keying causes the torsional operating stresses to be at least partially transferred to the keys themselves, through which the load passes.

Once the first component 12 is joined to the second component 14, a low-carbon steel to alloy steel weld is performed between the second component 14 and the third component 16. This weld is performed in accordance with the inertia welding and friction welding set forth in U.S. Pat. No. 5,492,264. The carbon content of the second component 14 must be low enough so as to avoid the formation of brittle, untempered martensite in the weld region.

Unfavorable metallurgical changes may occur to the titanium alloy at approximately 1800° F. In order to avoid such changes, the brazing step is carried out at a temperature slightly lower than 1800° F. For example, if silver alloy braze is used, brazing is performed at a maximum temperature of 1700° F. which then becomes the temperature limitation of the component. This compares rather favorably with the 350° F. limitation associated with the aluminum interlayer multi-metal composite gear technology. The elevated brazing temperature does, however, produce an annealed or normalized structure in the low-carbon steel connecting member.

Although the lower strength condition of the intermediate steel component would be of inadequate hardness for a gear or bearing surface, the composite component as described is more than adequate as a structural member. The large load path cross-section results in stress amplitudes in the intermediate component that are well within safe levels for non-heat-treated materials.

Except in a very localized region of the weld, the inertia weld does not adversely affect the properties of the heat-treated third component 16. Consequently, the third component 16 can be quenched and tempered (and any features formed thereon, such as gear teeth, can be formed and gas carburized), prior to the welding operation. The treated third component 16 would remain unaffected, and retain the advantages of having been heat-treated, during subsequent service of the multi-metal composite object 10. As an additional measure, the assembly can be heated to around 300° for several hours in order to relieve any localized internal stresses that may be caused by inertia welding. This stress-relief operation does not adversely affect the heat-treated properties of the carburized features (such as bearing races or gear teeth) on the third component 16.

Figure 2:
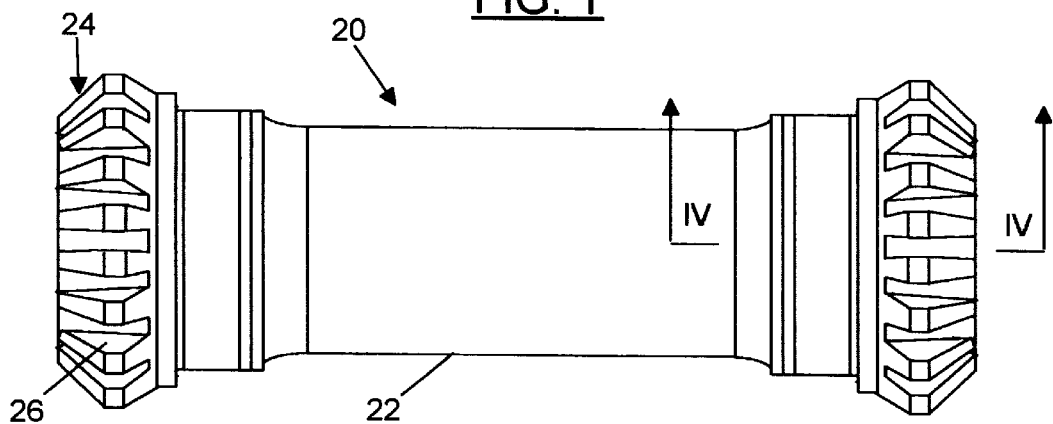
FIG. 2 illustrates an elevational view of a multi-metal composite gear assembly.

Turning now to FIG. 2, a gear assembly 20 is shown which embodies the principles of the present invention. The gear assembly 20 includes a shaft 22 fabricated from a titanium alloy, such as Ti-6Al-4V. Disposed at each end of the shaft 22 is a gear member 24 having a plurality of gear teeth 26.

Figure 3:
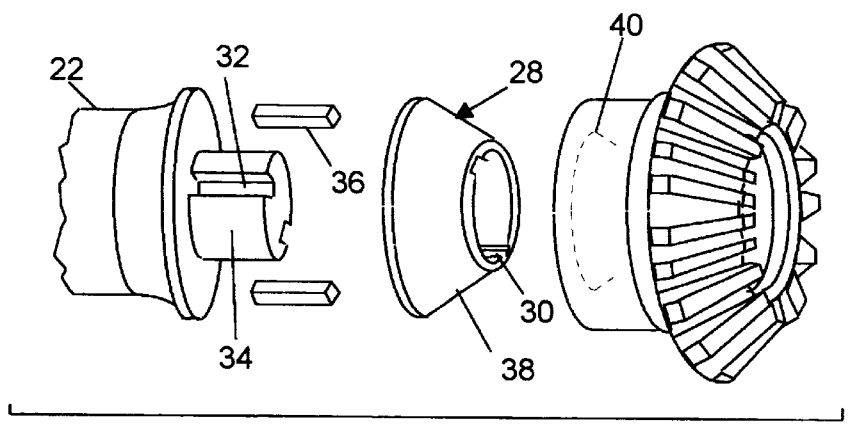
FIG. 3 is an exploded view of the gear assembly shown in FIG. 2.

As can be seen in FIG. 3, a connecting member 28 is provided between the shaft 22 and each gear member 24. The connecting member 28 is provided with grooves 30 which correspond in number and configuration with grooves 32 provided on a cylindrical extension 34 of an end of the shaft 22. The grooves 30, 32 are adapted to receive keys 36 when the subassembly including shaft 22, intermediate connecting member 28, and keys 36 are assembled prior to brazing. The connecting member 28 is also provided with a frustoconical surface 38, which corresponds in configuration to a frustoconical surface 40 on the gear member 24, as shown in FIG. 4.

Figure 4:
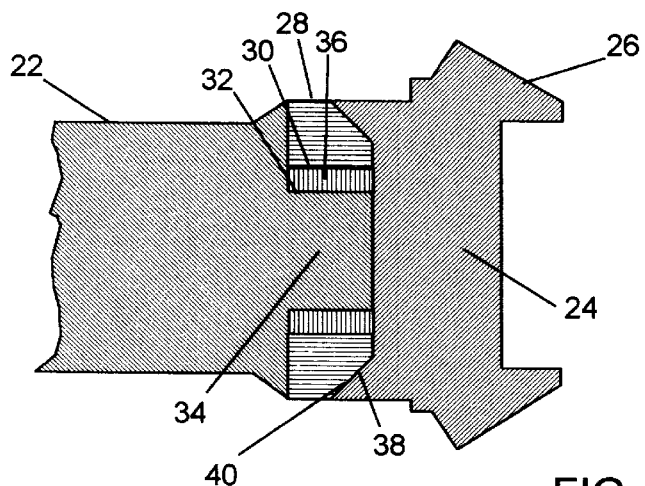
FIG. 4 is a sectional view taken along lines IV—IV of FIG. 2.

Fabrication of the gear assembly 20 may be understood by those of skill in the art with reference to the exploded view illustrated in FIG. 3 and the cross-sectional view of FIG. 4.

The connecting member 28 and the extension 34 of the shaft 22 are brought together with the grooves 30, 32 aligned, and the keys 36 are inserted therein. Next, this subassembly is brazed completely along all interfaces between the connecting member 28, the shaft 22, and the keys 36. Finally, the frustoconical surface 38 of the connecting member 28 is welded to the frustoconical surface 40 of the gear member 24 by inertia welding or friction welding.

Figure 5:
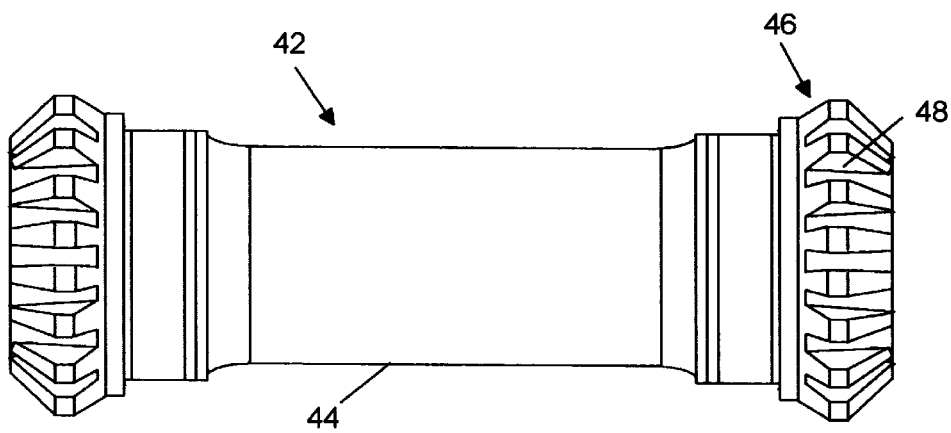
FIG. 5 illustrates an elevational view of a multi-metal composite gear assembly.

Turning next to FIG. 5, a gear assembly 42 is shown which also embodies the principles of the present invention. The gear assembly 42 includes a shaft 44 fabricated from a titanium alloy, such as Ti-6Al-4V. Disposed at each end of the shaft 44 is a gear member 46 having a plurality of gear teeth 48.

Figure 6:
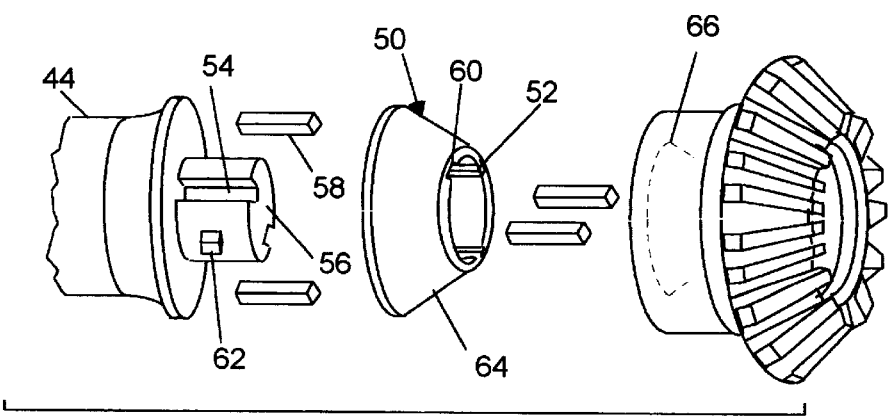
FIG. 6 is an exploded view of the gear assembly shown in FIG. 5.

As can be seen in FIG. 6, a connecting member 50 is provided between the shaft 44 and each gear member 46. The connecting member 50 is provided with grooves 52 which correspond in number and configuration with grooves 54 on a cylindrical extension 56 on an end of the shaft 44. The grooves 52, 54 are adapted to receive keys 58 when the gear assembly 42 is assembled. Additionally, the connecting member 50 is provided with arcuate cam slots 60, which extend from the grooves 52 and are adapted to receive cam followers 62 on the cylindrical extension 56 in a "bayonet" connection. The connecting member 50 is also provided with a frustoconical surface 64, which corresponds in configuration to a frustoconical surface 66 on the gear member 46.

Fabrication of the gear assembly 42 is as follows. The connecting member 50 and the extension 56 of the shaft 44 are brought together with the cam followers 62 inserted into the grooves 52. The connecting member 50 and the shaft 44 are then rotated relative to one another, such that the cam followers 62 travel along the arcuate cam slots 60, and the grooves 52 are brought into alignment with the grooves 54. Next, the keys 58 are inserted into the aligned grooves 52, 54, and the subassembly is brazed completely along all interfaces between the connecting member 50 (including the cam followers 62), the shaft 44 (including the cam slots 60), and the keys 58. Finally, the frustoconical surface 64 of the connecting member 50 is welded to the frustoconical surface 66 of the gear member 46 by inertia welding or friction welding.

Thus it is apparent that in accordance with the present invention, an apparatus that fully satisfies the objectives, aims, and advantages achievable in accordance with the principles of the present invention is set forth in the above exemplary embodiments. The present invention achieves the weight and strength of previously known technologies while allowing the gear assembly to operate for meaningful periods of time at temperatures in excess of 1000° F. The process of joining the elements of the multi-metal composite object is accomplished such that service abuse limitations are those associated with the gear teeth, rather than the joining process itself, as is the case with single-material assemblies. This is accomplished while achieving significant weight reductions, perhaps in the order of 25–30%, depending on the particular component geometry and specifications.

While the invention has been described in conjunction with the exemplary embodiments, it is evident that many alternatives, modifications, permutations, and variations will become apparent to those skilled in the art in light of the foregoing description. For example, the locations of the cam followers and slots could be reversed, or other materials used for brazing, or for the components themselves. It is also conceivable that the keying mechanisms could be eliminated entirely. The present invention could also find utility in applications other than gear assemblies, for example, in other rotational drive members. Accordingly, it is intended that all such alternatives, modifications, permutations, and variations to the exemplary embodiments can be made without departing from the scope and spirit of the present invention as set forth in the appended claims.

What is claimed is:

1. A multi-element composite object comprising the following:
    a first component fabricated from a first metal having desirable heat-sensitive metallurgical properties;
    a second component, fabricated from a second metal, brazed to the first component; and
    a third component, fabricated from a third metal, inertia welded to the second component;
    wherein the first metal and the third metal are weld incompatible, and whereby the brazing of the second component to the first component is performed at a temperature at which the desirable, heat-sensitive metallurgical properties of the first component are not adversely altered.

2. A multi-element composite object according to claim 1, wherein the first metal is a titanium alloy.

3. A multi-element composite object according to claim 2, wherein the first metal is a TiNi alloy.

4. A multi-element composite object according to claim 1, wherein the second metal is steel.

5. A multi-element composite object according to claim 4, wherein the second metal is low-carbon steel.

6. A multi-element composite object according to claim 1, wherein the third metal is a steel alloy.

7. A multi-element composite object according to claim 6, wherein the third metal is 9310 nickel alloy steel.

8. A multi-element composite object according to claim 1, wherein the multi-element composite object is a gear assembly.

9. A multi-element composite object according to claim 8, wherein the first component of the gear assembly object is a shaft.

10. A multi-element composite object according to claim 8, wherein the third component of the gear assembly is a gear member.

11. A multi-element composite object according to claim 9, wherein the third component of the gear assembly is a gear member with hardened teeth surfaces.

12. A multi-element composite object comprising the following:
    a titanium alloy component having desirable heat-sensitive metallurgical properties;
    a low-carbon steel component brazed to the titanium alloy component; and
    an alloy steel component inertia welded to the low-carbon steel component;
    whereby the brazing of the low-carbon steel component to the titanium alloy component is performed at a temperature at which the desirable, heat-sensitive metallurgical properties of the titanium alloy component are not adversely altered.

13. A multi-element composite object according to claim 12, further comprising an anti-rotational mechanism connected between the Ti alloy component and the low-carbon steel component.

14. A multi-element composite object according to claim 13, wherein the anti-rotational element comprises a pin-in-groove arrangement.

15. A multi-element composite object according to claim 13, wherein the anti-rotational element comprises a twist-fit arrangement.

16. A multi-element composite object according to claim 12, wherein the multi-element composite object is a gear assembly.

* * * * *

UNITED STATES PATENT AND TRADEMARK OFFICE
CERTIFICATE OF CORRECTION

PATENT NO.   : 6,326,089 B1　　　　　　　　　　　　　　　　Page 1 of 1
DATED        : December 4, 2001
INVENTOR(S)  : Raymond J. Claxton It is certified that error appears in the above-identified patent and that said Letters Patent is hereby corrected as shown below:

Title page,
ABSTRACT, line 24, "net" should be -- next --.

Column 3,
Line 67, "it" should be -- if --.

Column 6,
Lines 5-17, should read as follow:
     1. A multi-element composite object comprising the following
         a first component fabricated from a first metal;
         a second component, fabricated from a second metal,
            brazed to the first component; and
         a third component, fabricated from a third metal,
            inertia welded to the second component;
         wherein the first metal and the third metal are weld incompatible.
Lines 41-53, should read as follow:
     12. A multi-element composite object comprising the following
         a titanium alloy component;
         a low-carbon steel component brazed to the titanium
            alloy component; and
         an alloy steel component inertia welded to the low-
            carbon steel component.

Signed and Sealed this

Seventh Day of May, 2002

*Attest:*

JAMES E. ROGAN
   *Attesting Officer*　　　　　　　　　　*Director of the United States Patent and Trademark Office*

UNITED STATES PATENT AND TRADEMARK OFFICE
CERTIFICATE OF CORRECTION

PATENT NO.    : 6,326,089 B1
DATED         : December 4, 2001
INVENTOR(S)   : Raymond J. Claxton It is certified that error appears in the above-identified patent and that said Letters Patent is hereby corrected as shown below:

<u>Title page,</u>
ABSTRACT, line 24, "net" should be -- next --.

<u>Column 3,</u>
Line 67, "it" should be -- if --.

<u>Column 6,</u>
Lines 5-17, should read as follow:
      1. A multi-element composite object comprising the following
         a first component fabricated from a first metal;
         a second component, fabricated from a second metal,
            brazed to the first component; and
         a third component, fabricated from a third metal,
            inertia welded to the second component;
         wherein the first metal and the third metal are weld incompatible.
Lines 41-53, should read as follow:
      12. A multi-element composite object comprising the following
         a titanium alloy component;
         a low-carbon steel component brazed to the titanium
            alloy component; and
         an alloy steel component inertia welded to the low-
            carbon steel component.

This certificate supersedes Certificate of Correction issued May 7, 2002

Signed and Sealed this

Eleventh Day of June, 2002

*Attest:*

JAMES E. ROGAN
   *Attesting Officer*                *Director of the United States Patent and Trademark Office*